United States Patent

Armstrong et al.

[11] 3,756,128
[45] Sept. 4, 1973

[54] SINGLE STAGE CUTTING SYSTEM FOR FIBER CANS

[75] Inventors: Lowell Armstrong, Louisville, Ky.; Edward A. Van Waes, Golden Valley, Minn.

[73] Assignee: The Pillsbury Company, Minneapolis, Minn.

[22] Filed: Jan. 6, 1972

[21] Appl. No.: 215,725

[52] U.S. Cl............................ 93/80, 82/53.1, 82/100
[51] Int. Cl.................................................. B31c 3/00
[58] Field of Search ................... 93/80; 82/53.1, 56, 82/98, 100

[56] References Cited
UNITED STATES PATENTS

| | | | |
|---|---|---|---|
| 2,699,099 | 1/1955 | Robinson | 93/80 |
| 3,158,074 | 11/1964 | Brigham | 93/80 |
| 3,229,598 | 1/1966 | Yovanorich | 93/80 |
| 3,397,625 | 8/1968 | Leonardi | 93/80 |

Primary Examiner—Andrew R. Juhasz
Assistant Examiner—John Sipos
Attorney—Ronald E. Lund

[57] ABSTRACT

A combined forming and cutting apparatus for spiral wound fiber cans is composed of a supporting framework, a winding mandrel on which paperboard strips are wound into a tube and an anvil aligned axially with the mandrel to receive the continuously formed tube as it is withdrawn from the mandrel. A reciprocating carriage positioned in lateral alignment with the anvil has mounted upon it two banks of cutting knives comprising a first bank of knives for cutting the containers apart from one another and the second bank adapted to simultaniously cut partially through the container to form a circumferential collar cut spaced axially from the end cut. The collar cut knife is provided with an axially aligned longitudinally spaced circular can engaging stop for limiting the depth of the cut formed by the collar cut knife.

14 Claims, 7 Drawing Figures

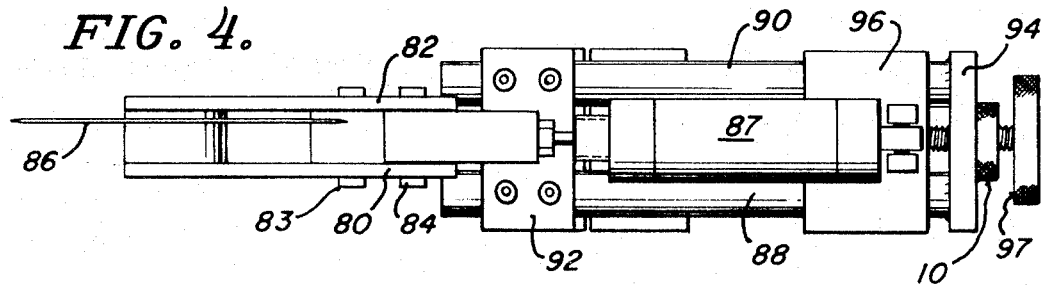
FIG. 4.
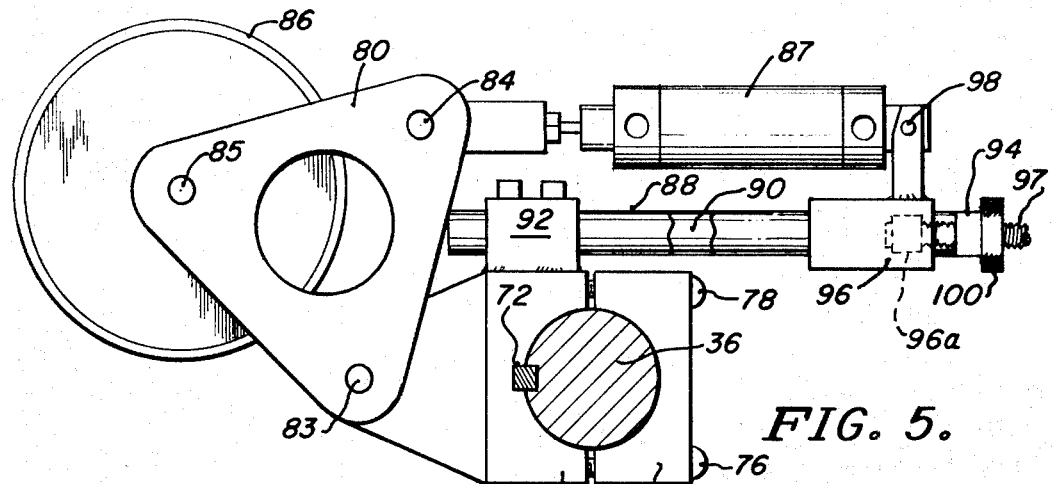
FIG. 5.
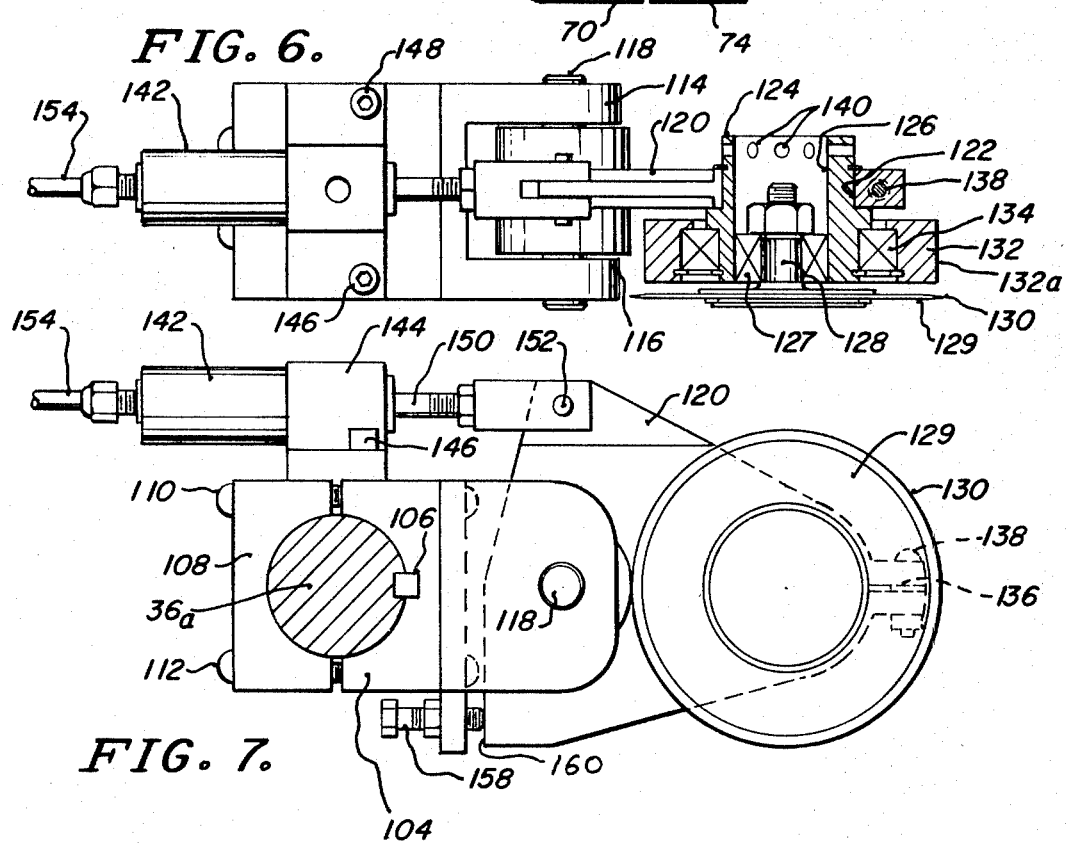
FIG. 6.
FIG. 7.

SINGLE STAGE CUTTING SYSTEM FOR FIBER CANS

THE PRIOR ART

In spirally wound fiberboard containers or cans of the type described in U.S. Pat. Nos. 2,793,126, 2,793,127 and 3,144,193, a circumferential cut partially through the cans is provided a short distance from one end (hereinafter referred to as a collar cut). The previous system used for making the collar cut consisted of first cutting the freshly formed tube into pieces several feet, typically, four feet long. These tubes were then stored temporarily and conveyed to a recut machine in which the tubes were cut to length and a collar cut simultaniously formed. As this was done the tube was rotated but was not moved axially. The prior system required additional handling after the tube was formed and the second step necessitated additional equipment, added manufacturing space and required an additional operator as well as a greater capital investment. Tube cutting is described for example in U.S. Pat. Nos. 2,737,091 and 3,264,956.

OBJECTS OF THE INVENTION

In view of these and other deficiencies of the prior art the invention has among its objects (a) the provision of an improved system for producing spiral wound cans of the kind having a collar cut with a means for forming the collar cut and for separating the cans from one another while the material being cut is still a portion of the original tube whereby all of the cuts can be accomplished upon the apparatus on which the tube is formed (b) to lower the cost of can production (c) to reduce the amount of capital investment required in forming collar cut cans (d) to reduce the number of operators required for producing collar cut cans (e) to increase operating speeds (f) to provide all of the required cutting knives on a single machine with a provision for simultaniously or almost simultaniously performing all cutoff operations on one machine (g) a provision for reliably controlling the cut depth of the collar cut and for maintaining accurate cutoff control while the knives reciprocate in timed relationship with the tube being formed (h) to prevent undesired spiralling of the cut around the circumference of the freshly formed tube (i) a provision for providing a precise cutoff location for controlling the can length and (j) provision for maintaining a predetermined spacing between the collar cut and the end of the can.

THE FIGURES

FIG. 4 is a plan view of the end-cut knife and actuating apparatus.

FIG. 5 is an end elevational view of the end cutting knife of FIG. 4.

FIG. 6 is a plan view of the collar cut knife and associated structure.

FIG. 7 is an end elevational view of the collar cut knife mechanism.

SUMMARY OF THE INVENTION

Briefly, the present invention provides a method and apparatus for forming spiral wound paper tubes with can length cut-off knives and collar cut knives provided to operate directly on the freshly formed tube. In a preferred form of the invention is provided a combined forming and cutting apparatus for spiral wound fiber cans composed of a supporting framework, a winding mandrel on which paperboard strips are wound into a tube and an anvil aligned axially with the mandrel to receive the continuously formed tube as it is withdrawn from the mandrel. A reciprocating carriage positioned in lateral alignment with the anvil has mounted upon it two banks of cutting knives comprising a first bank of knives for cutting the containers apart from one another and the second bank adapted to simultaniously cut partially through the container to form a circumferential collar cut spaced axially from the end cut. The collar cut knife is provided with an axially aligned longitudinally spaced circular can engaging stop for limiting the depth of the cut formed by the collar cut knife.

THE PREFERRED EMBODIMENT

Figure 1:
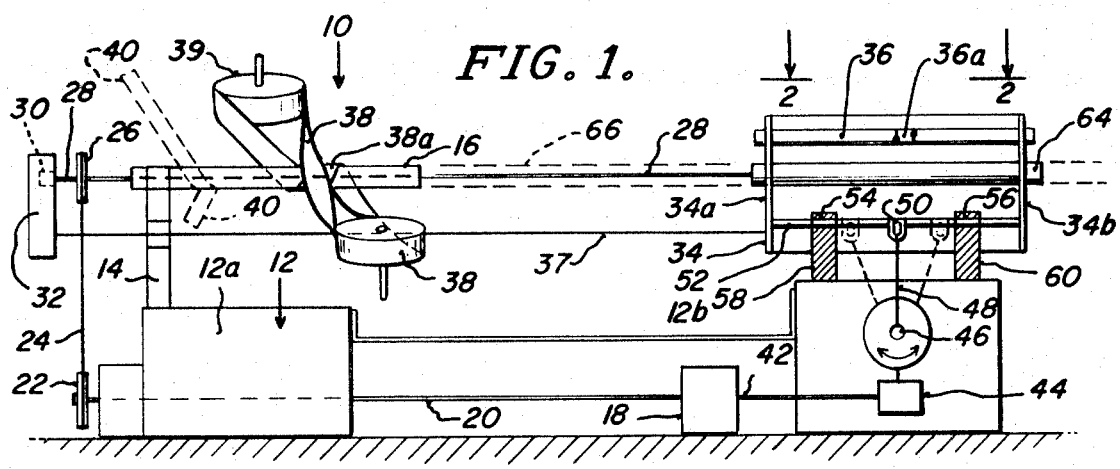
FIG. 1 is a semidiagramatic side elevational view of the apparatus embodying the invention.

In FIG. 1 is shown a tube cutting and forming apparatus 10 comprising a supporting framework 12 including a mandrel supporting framework 12a and a carriage supporting framework 12b. The mandrel supporting framework is provided with a support post 14 a longitudinally extending horizontally disposed cylindrical mandrel 16 is rigidly connected to the top of post 14. An electric drive motor 18 having a drive shaft 20 and a sprocket 22 is connected via chain 24 to a sprocket 26 which is feather splined to an anvil driveshaft 28 having its left end as seen in the figure mounted for rotation in the bearing 30 within a guide 32 connected rigidly by means of a tie rod 37 to a carriage 34 to be described below.

A pair of vertically disposed drive pulleys 38 and 39 are positioned on opposite sides of the mandrel 16 and are connected by a drive belt 38 having a portion 38a which is wrapped around the mandrel to drive the freshly formed spiral tube composed of strips 40 only two of which are shown. The motor 18 is connected by drive shaft 42 to a speed reducing transmission 44 having an osciliating output shaft 46 which has connected to it a vertically extending drive arm 48 that oscilates through an arc of approximately 40°. The upper end of the arm 48 is connected by means of a pivot 50 moving in a vertical slot to the carriage 34 which is composed of vertically disposed longitudinally spaced end plates 34a and 34b connected together by a pair of longitudinally extending spacer rods 36 and 36a and a pair of laterally spaced parallel longitudinally extending slide rods 52, only one of which is shown. The slide rods 52 extend through linear bushings 54 and 56 in pedestals 58 and 60. The pedestals are provided with a second pair of bushings (not shown) for the second slide rod 52 on the far side of the apparatus as seen in FIG. 1.

It will be understood that during operation the arm 48 will osciliate to the right and left causing the carriage and anvil 64 to move correspondingly to the right and left in syncronization with the rotation of shaft 28.

Each of the end cutting knives will now be described by reference to FIGS. 2,3,4 and 5. As seen for example in FIG. 5, the supporting bracket 70 is secured to the shaft 36 by key 72. A cap 74 connected by screws 76 and 78 retain the bracket 70 in position. To the left end of the bracket 70 is connected to a pair of longitudinally spaced parallel triangular knife support plates 80 and 82 by means of a pivot pin 83. The circular cutting knife 86 is mounted for rotation at the free ends of the supports upon a bearing 85.

The knife is moved downwardly into the downward position by pivoting the supports 80 and 82 counter-clockwise as seen in FIG. 5 by means of a pneumatic actuator 87 connected to the supports by a pivot pin 84. A pair of horizontally disposed supporting rods 88 and 90 are connected rigidly to the bracket 70 via block 92. The right ends of the rods 88 and 90 are rigidly connected together by a cross piece 94 suitably affixed to the rods as by welding. An adjustment head 96 is suitably bored with two openings to slidably receive the rods 88 and 90. The adjustment head is connected to the crosspiece 94 by an adjustment screw 97 the left end of which is mounted for rotation within the block 96 by a bearing 96a constructed to prevent axial movement of the screw 97 in the block 96. In this way the turning of the adjustment knob at the end of screw 97 will turn the screw 97 to the left or right within its threaded connection in the crosspiece 94 thereby positioning the head 96 which is connected at 98 to the right end of the actuator 87. A stop nut 100 is used for locking the head and the actuator 87 in the desired position.

Figure 2:
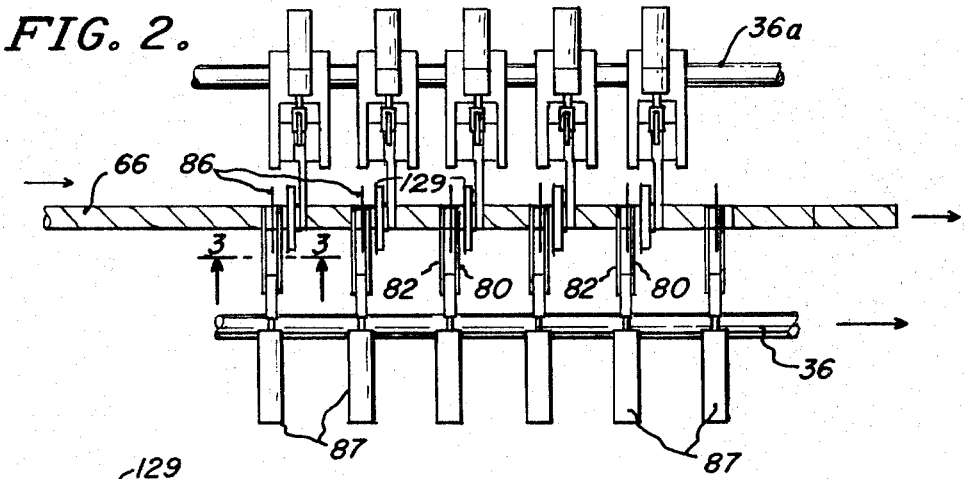
FIG. 2 is a plan view taken on line 2—2 of FIG. 1.
Figure 3:
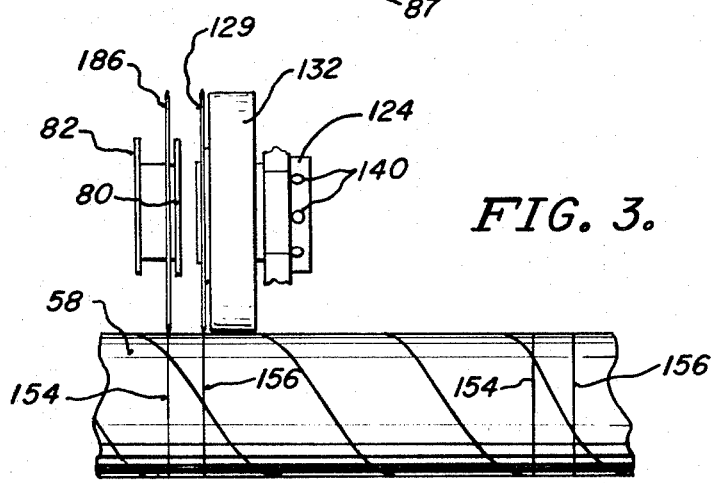
FIG. 3 is a side elevational view of a freshly formed tube being cut on an enlarged scale relative to FIG. 2.

Refer now to FIGS. 2, 6 and 7 which illustrate each of the collar cutting knives. As shown in FIG. 2, the collar cutting knives 129 are spaced axially an equal distance from the end cutting knives on the support shaft 36a by the position of a bracket 104, key 106 and cap 108 secured in place by screws 110 and 112. The bracket is provided in its right end as seen in FIGS. 6 and 7 with spaced arms 114 and 116 through which a pivot pin 118 is passed to support a mounting plate 120 that is bored at 122 to receive a cylindrical arbor 124 having an eccentric bore 126 in which is mounted a bearing such as a ball bearing 127 that supports the shaft 128 of a collar cut knife 129. The sharpened edge 130 of the collar cut knife is thus concentric with the shaft 128 which is located at exactly the center of the bore 126. A cylindrical stop element 132 is supported by a ball bearing 134 upon the outside of the cylindrical arbor 124 with its outside cylindrical surface 132a concentric with the bore 122 and the outside surface of the arbor 124. The extreme right end of the mounting plate 120 is split at 136. The split ends of the mounting plate 120 are connected by a suitable threaded fastener 138. Openings are provided at 140 for a spanner wrench.

The actuation of the collar cut knife 129 is controlled by a suitable actuator such as air cylinder 142 which is supported on a mounting post 144 affixed to the supporting bracket 104 by cap screws 146 and 148. The moving cylinder of the actuator 142 is connected by a link 150 to a pivot 152 that extends through the upper edge of the supporting plate 120.

During operation, the introduction of air through the line 154 causes each of the cylinders to move toward the right of the figures thereby causing the pivot 152 to move toward the right and the collar cut knife to be lowered into engagement with the spirally formed tube 66.

The operation of the apparatus is as follows:

The motor 18 is started thereby turning the shaft 28 which supports the anvil 64 and begins the axial oscillation of the carriage 34, tie rod 37 shaft 28 and anvil 64. The pulleys 38 and 39 are also started and are suitably syncronized with the motor 18. The strips 40 are then fed to the mandrel 16 and are drawn over the mandrel 16 by belt 38. toward the right whereby the tube 66 is formed as glue (not shown) is applied conventionally to the edges of the strips.

The freshly formed tube 66 will travel toward the right over the anvil 64 into the carriage 34 as shown in FIG. 2. A suitable actuating mechanism is employed which per se forms no part of the present invention. It consists typically of highly reflective spots on the tube which serve as a means for actuating a photocell (not shown) which is suitably connected to operate the actuators 87 and 142. In any event, the actuating mechanism causes air to be introduced to the cylinders thereby lowering the end cutting knives 86 and the collar cutting knives 129 simultaneously into engagement with the freshly formed tube 66 thereby simultaneously cutting the tube into can length sections with the cuts 154 and forming the collar cuts 156 (FIG. 3) while the carriage and anvil move in sychronization, i.e., at the same speed and in the same direction as the tube. The cans are then pushed off the right end of the anvil 64 by the freshly formed tube 66 and are ready to be capped.

The precise depth of the end cuts 154 is reliably controlled by turning the screw 97 thereby locating the cylinders 87. The depth of the collar cut is accurately controlled by turning the arbor 124 in bore 122 using a spanner wrench inserted in the openings 140. The fastener 138 is then securely tightened. We have found that by mounting the cutting knife 129 eccentric of bore 122 by distance of about ⅛ inch that the depth of the collar cut can be controlled with a high degree of precision. A secondary stop comprising a bolt 158 inserted into the bracket 104 can be employed as a secondary or backup depth control by engaging a portion of the collar cut knife supporting plate at 160.

While the knives have been described as operating simultaneously, it should be understood that they need not so long as they are all operated before the carriage has started its return motion toward the left as seen in FIG. 1.

Since tube winding and cutting without the features of the present invention is highly developed and well known to those skilled in the art, many details of construction have not been shown. Reference can be made concerning such features to U.S. Pat. Nos.

| 2,734,432 | 2,712,778 | 2,699,099 |
| 2,737,091 | 3,150,574 | 3,139,011 |
| 3,150,575 | 3,133,483 | 3,264,956 |
| 3,292,473 | | | which are incorporated herein by reference.

What is claimed is:

1. A can cutting apparatus for forming and cutting containers composed of paper strips comprising a supporting framework, a longitudinally extending cylindrical winding mandrel, a drive means to wind the strips over the mandrel to form a paper tube having a spiral seam between the edges of the strips, a knife support carriage mounted for axial sliding motion longitudinally of the mandrel and paper tube, an anvil mounted for rotation within the carriage on an axis concentric with the tube and positioned therewithin, means oscillating the carriage and the anvil in unison to the left and right longitudinally of the tube and in synchronization therewith, a plurality of axially spaced container end cut-off knives mounted upon the carriage for movement on an axis extending toward and away from the tube, actuator means connected to the knives to move them into and out of cutting position, a plurality of collar cut knives mounted upon the carriage for movement on an axis toward and away from the tube, actuators operatively connected to the collar cut knives for moving said knives toward the tube whereby the end cuts and collar cuts are formed within the period of time that the carriage moves in synchronization with the freshly formed tube.

2. The apparatus of claim 1 wherein the end cut-off knives are mounted laterally of the tube and anvil on one side of the carriage and the collar cut knives are mounted laterally of the tube and anvil upon said carriage on the other side thereof from the end cut-off knives.

3. The apparatus of claim 1 wherein the end cut-off knives alternate with the collar cut knives along an axis extending parallel to the axis of the tube and anvil.

4. The apparatus of claim 1 wherein the knives are circular cutting blades mounted for rotation upon its central axis and each blade is pivotally mounted upon the carriage for movement toward and away from the tube and actuator means is connected thereto for selectively moving the knives into and out of cutting engagement with the tube.

5. The apparatus of claim 4 wherein a stop member is connected to the collar cut knife to engage the tube when the collar cut knife is in its cutting position to thereby limit the depth of cut.

6. The apparatus of claim 5 wherein the stop is a rotatable cylinder mounted for rotation upon an axis eccentric from the axis of the collar cut knife.

7. The apparatus of claim 1 wherein a stop member is connected to the collar cut knife to engage the tube when the collar cut knife is in its cutting position to thereby limit the depth of cut.

8. The apparatus of claim 7 wherein the stop is a rotatable cylinder mounted for rotation upon an axis eccentric from the axis of the collar cut knife.

9. The apparatus of claim 1 wherein said collar cutting knives each comprise a bracket, a support plate pivoted thereto for movement toward and away from the tube, an actuator connected between the bracket and the plate for moving the knife to its cutting position and a rotatable stop mounted upon the plate adjacent to the knife to limit the cut depth.

10. The apparatus of claim 9 wherein the stop is a rotatable cylinder adapted to rotate on an axis eccentric to the axis of rotation of the collar cut knife and means is provided to selectively change the offset between the collar cut knife and the stop.

11. The apparatus of claim 4 wherein said collar cutting knives each comprise a bracket, a support plate pivoted thereto for movement toward and away from the tube, an actuator connected between the bracket and the plate for moving the knife to its cutting position and a rotatable stop mounted upon the plate adjacent to the knife to limit the cut depth.

12. The apparatus of claim 11 wherein the stop is a rotatable cylinder adapted to rotate on an axis eccentric to the axis of rotation of the collar cut knife and means is provided to selectively change the offset between the collar cut knife and the stop.

13. A single stage method of assembling and cutting fiber cans formed upon a mandrel from spirally wound paper strips and fed over an anvil comprising winding the strips on the mandrel to form a tube, cutting the tube into can length sections and forming collar cuts partially through said tube while said tube is engaged over the anvil.

14. The method of claim 13 wherein the collar cuts are formed simultaneously with cutting the tube to can length.

* * * * *